Jan. 29, 1935.　　　A. LAIZÉ　　　1,989,321
TRACTION DEVICE
Filed March 8, 1932　　2 Sheets-Sheet 1

Inventor
Auguste Laizé
By
Attorney

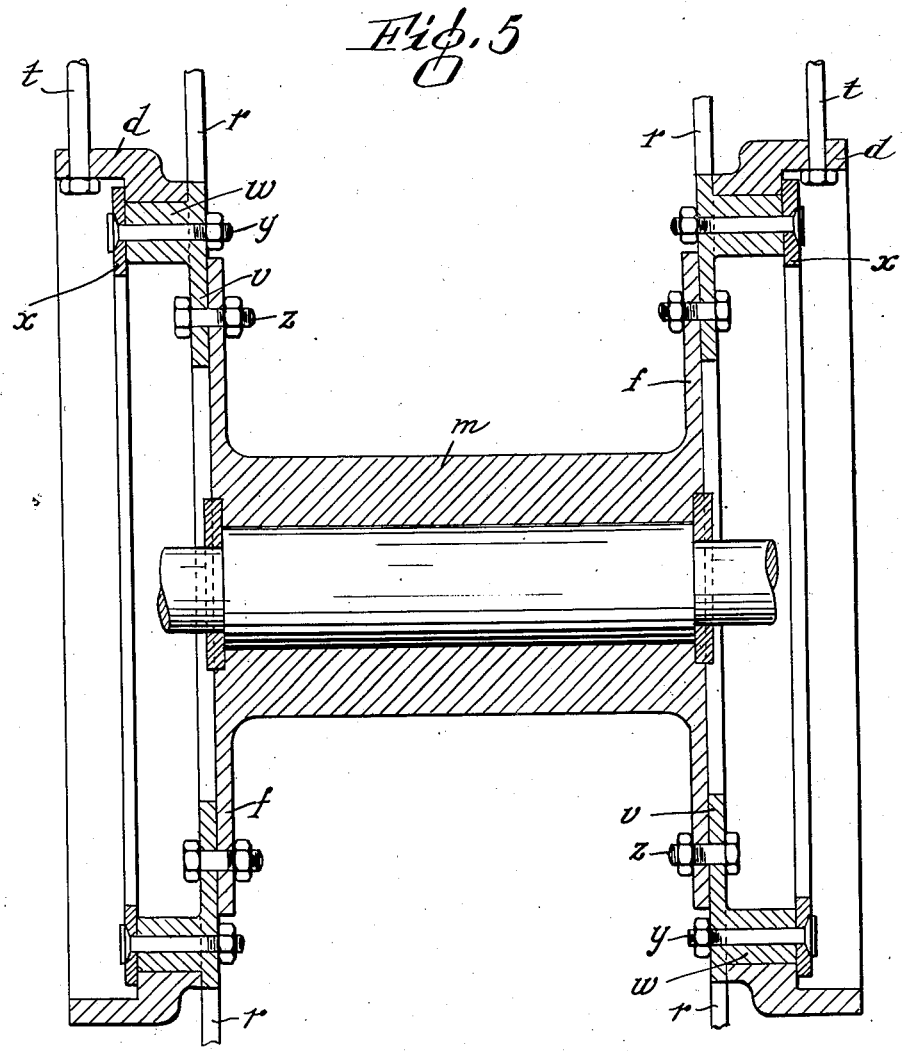

Patented Jan. 29, 1935

1,989,321

UNITED STATES PATENT OFFICE 1,989,321

TRACTION DEVICE

Auguste Laizé, La Bohalle, France

Application March 8, 1932, Serial No. 597,570
In France March 28, 1931

1 Claim. (Cl. 305—6)

This invention has for its object to avoid the traction disadvantages actually existing in lorries or other vehicles on soft or uneven ground.

The present invention is an improvement in vehicles whereby a wheel is provided having a circular endless track on which the proper driving wheel of the vehicle is adapted to run.

In the accompanying drawings:

Figure 5 is a detail view of the hub portion of the traction device in axial section.

Figure 1:
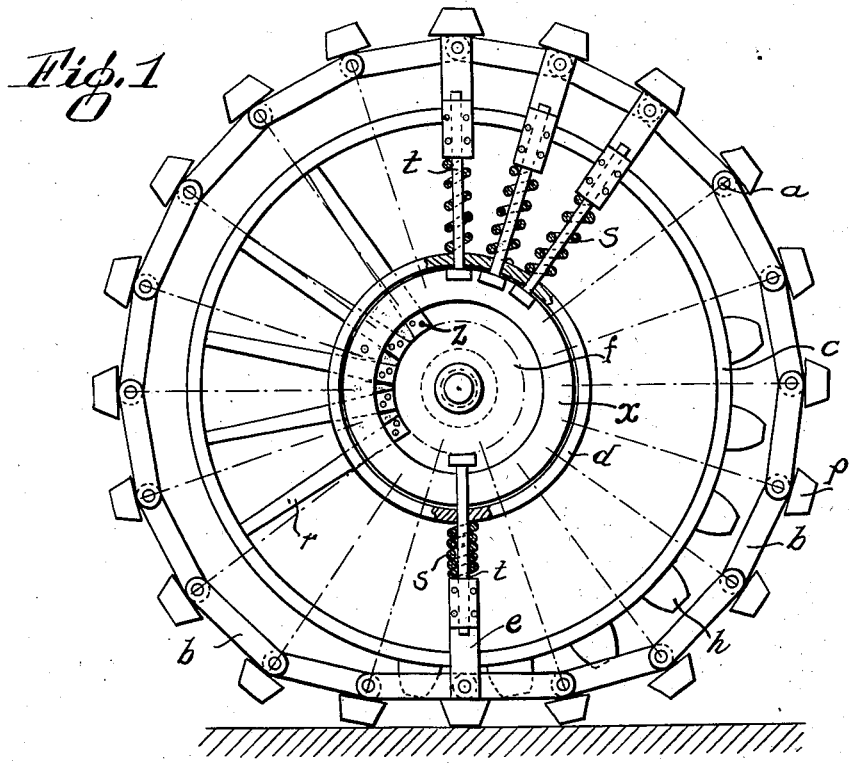
Figure 1 is a front elevation view of the wheel according to the invention, parts being shown in section and parts being omitted.
Figure 2:
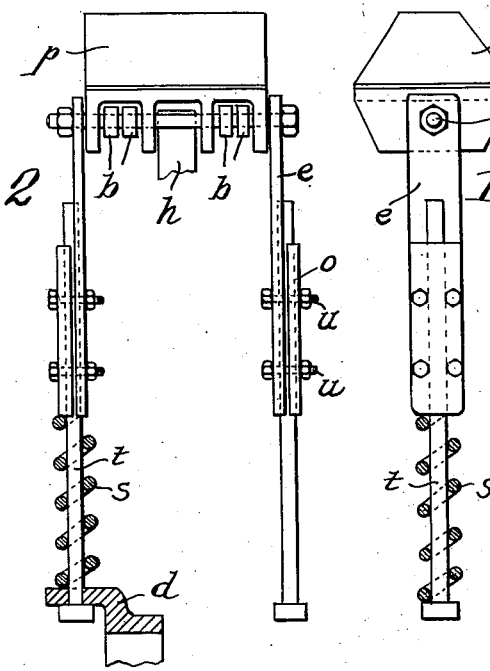
Figures 2 and 3 are enlarged detail views.

The device according to this invention includes a driving wheel represented by its rim $c$ and a few spokes $r$, the hub $m$ of which is provided with two flanges $f$ as shown in Figures 1 and 5.

To this flange $f$, at both ends of the hub $m$, is secured a circular ring $v$ having a portion $w$ machined to serve as a bearing for the rings $d$ rotatably mounted thereon. A retaining member $x$ is used to prevent lateral displacement of the ring $d$, said retaining member being held by bolts $y$. Thus, this arrangement permits rotation of the rod—retaining rings $d$ over the hub member, to compensate for circumferential speed differences existing between the rim $c$ and the track $b$.

The spokes $r$ form a part of the ring $v$ and extend therefrom radially. These are secured to the hub flanges $f$ by means of the bolts $z$ shown in Figures 1 and 5.

Each ring $d$ has a circumferential axially extending flange provided with circumferentially spaced radial apertures. A series of rods $t$ have their inner ends extended radially inwardly through the apertures in each flange. The inner ends of these rods have heads adapted to rest against the inner periphery of the flange to limit the radially outward movement of the rods. An endless track comprising links $b$ pivotally connected by pins $a$, and cleats $p$ mounted on the pins, surrounds the wheel $c$. The rods $t$ have their outer ends clamped to bars $e$ pivotally connected to the ends of pins $a$ at each side of the endless track. A coil spring $s$ embraces each rod $t$ and at its inner ends rests on the outer periphery of the flange on the ring $d$ while its outer end presses against a stop portion on the rod $t$ constituted by said bar $e$. The rods and springs hold that portion of the endless track, not in contact with the ground, radially spaced from the wheel $c$ but that portion of the endless track in contact with the ground is allowed to flatten out as shown in Figure 1, compressing certain springs $s$.

When the wheel rests on the ground at the axis of a rod, or at an intermediate point between two cleats, the load is distributed on two, three or even four cleats.

These cleats being mounted around pins $a$ can oscillate slightly around the said pins in order to follow the rotary motion of the device, and to take the best position corresponding to the highest adherence; the cleats also rest quite horizontally on the ground and leave it in the same manner.

Oscillation of the cleats may be dispensed with. In such case, the cleats are secured in pairs on each pair of links and adjacent the pivot pins thereof, as shown in Figure 4.

Figure 4:
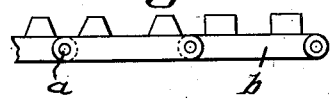
Figure 4 shows in side elevation a modified form of endless track.

The section of the cleats is trapezoidal, in principle, this being preferred for the driving wheels of a tractor, whereas the rectangular section, Fig. 4, may be suitably used for any other vehicle where it is desired to increase the load-bearing surfaces.

Figure 3:
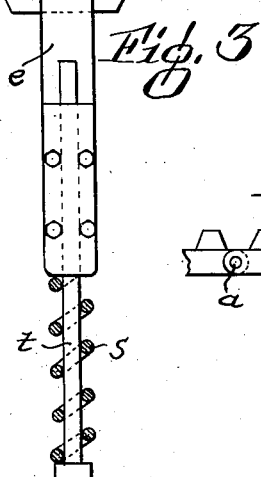

As soon as each cleat leaves the ground, to take anew its idle position corresponding to the maximum diameter of the extended track, a spring $s$, Figs. 1 and 3, extends and thus facilitates the longitudinal movement of the rod.

The rods $t$ are made adjustable longitudinally in order to insure the proper tension at all points of the track, the adjustment being effected by means of the device shown in Figure 3, which comprises a clamping plate $o$ secured by bolts $u$ to bar $e$ pivoted to pin $a$. As is evident, the plate $o$ operates to frictionally secure the rod $t$ in suitable adjustment against the bar $e$ whenever said bolts are drawn up tight. Loosening the bolts releases the rods for further adjustment according to the result desired.

The engagement of the wheel on the rolling path is had by means of teeth $h$ fitting between and engaging the pins of the links.

Having described my invention and the manner in which it operates, what I claim is:

In a traction device for vehicles, a wheel comprising a hub, a rigid rim having teeth on its periphery, and spokes connecting the hub and rim; an endless flexible track surrounding said wheel and having portions adapted to be engaged by said teeth; a flanged ring rotatably mounted on each end of the hub; a series of radially extending rods slidably mounted at their inner ends in each flanged ring and connected at their outer ends to the endless track; resilient means urging said rods radially outwardly; and means on the inner ends of the rods to limit the outward movement of the rods.

AUGUSTE LAIZÉ.